(12) United States Patent
Tobari et al.

(10) Patent No.: US 12,383,996 B2
(45) Date of Patent: Aug. 12, 2025

(54) ROTARY TABLE

(71) Applicant: NIPPON THOMPSON CO., LTD., Tokyo (JP)

(72) Inventors: Kousuke Tobari, Toki (JP); Tetsuya Sakai, Toki (JP)

(73) Assignee: NIPPON THOMPSON CO., LTD., Tokyo (JP)

( * ) Notice: Subject to any disclaimer, the term of this patent is extended or adjusted under 35 U.S.C. 154(b) by 108 days.

(21) Appl. No.: 18/564,229

(22) PCT Filed: Mar. 29, 2022

(86) PCT No.: PCT/JP2022/015587
§ 371 (c)(1),
(2) Date: Nov. 27, 2023

(87) PCT Pub. No.: WO2022/249744
PCT Pub. Date: Dec. 1, 2022

(65) Prior Publication Data
US 2024/0253171 A1    Aug. 1, 2024

(30) Foreign Application Priority Data

May 27, 2021    (JP) .................. 2021-089430

(51) Int. Cl.
*B23Q 1/52*    (2006.01)
*B23Q 16/06*    (2006.01)
*B23Q 17/00*    (2006.01)

(52) U.S. Cl.
CPC .............. *B23Q 1/52* (2013.01); *B23Q 16/06* (2013.01); *B23Q 17/003* (2013.01)

(58) Field of Classification Search
CPC .................................................. B23Q 17/003
See application file for complete search history.

(56) References Cited

U.S. PATENT DOCUMENTS 5,784,932 A * 7/1998 Gilberti ................. B23Q 17/24
108/22
6,722,289 B2 * 4/2004 Kato .................... B23Q 16/026
108/22

(Continued)

FOREIGN PATENT DOCUMENTS

| JP | H03-144151 A | 6/1991 |
| JP | H03-167415 A | 7/1991 |

(Continued)

*Primary Examiner* — Vicky A Johnson
(74) *Attorney, Agent, or Firm* — Oliff PLC

(57) ABSTRACT

A rotary table includes a base body, a movable ring rotatably arranged on the base body, a fixed ring arranged on an inner periphery side of the movable ring and fixed to the base body, and a plurality of rolling elements. The rotary table includes a sensor fixed to the base body and a dog fixed to the movable ring. The movable ring has a scale extending at least at a portion of an outer peripheral side surface, and a groove-shaped recess formed to be recessed inward from an outer periphery of the movable ring at a position corresponding to the scale on the outer periphery. The dog has a leg portion fitted to the recess, and a detected portion protruding outward from the leg portion and detectable by the sensor. The leg portion is able to be fixed to the movable ring at any position in the recess.

8 Claims, 15 Drawing Sheets

(56) References Cited

U.S. PATENT DOCUMENTS

| | | | |
|---|---|---|---|
| 7,638,963 B2* | 12/2009 | Amendolea | ............ B23Q 16/02 |
| | | | 318/560 |
| 2022/0347807 A1 | 11/2022 | Takahashi | |

FOREIGN PATENT DOCUMENTS

| | | |
|---|---|---|
| JP | 2010-271098 A | 12/2010 |
| WO | 2021/090551 A1 | 5/2021 |

* cited by examiner

ROTARY TABLE

TECHNICAL FIELD

The present invention relates to a rotary table. The present application claims priority based on Japanese Patent Application No. 2021-089430 filed on May 27, 2021, the entire contents of which are incorporated herein by reference.

BACKGROUND ART

It is known in a rotary table to use a dog fixed to the rotary table and a sensor mounted on the base for the purpose of controlling the rotation operation of the table (see, for example, Patent Literature 1).

CITATION LIST

Patent Literature

Patent Literature 1: Japanese Patent Application Laid-Open No. H03-144151

SUMMARY OF INVENTION

Technical Problem

In a rotary table, it is preferable that the rotation angle can be easily set and also easily changed and adjusted. Therefore, one of the objects is to provide a rotary table that allows easy setting, and changing and adjustment of the rotation angle.

Solution to Problem

A rotary table according to the present disclosure includes: a base body having a planar holding surface; a movable ring arranged on the base body to be rotatable around an axis; a fixed ring arranged on an inner periphery side of the movable ring and fixed to the base body; and a plurality of rolling elements arranged to be rollable on an inner circumferential surface of the movable ring and an outer circumferential surface of the fixed ring. The rotary table includes a sensor fixed to the base body and a dog fixed to the movable ring. The movable ring has a scale extending at least at a portion of an outer peripheral side surface, and a groove-shaped recess formed to be recessed inward from an outer periphery of the movable ring at a position corresponding to the scale on the outer periphery. The dog has a leg portion fitted to the recess, and a detected portion protruding outward from the leg portion and detectable by the sensor. The leg portion is able to be fixed to the movable ring at any position in the recess.

Advantageous Effects of Invention

The rotary table described above allows easy setting, and changing and adjustment of the rotation angle.

DESCRIPTION OF EMBODIMENTS

Outline of Embodiments

Figure 1:
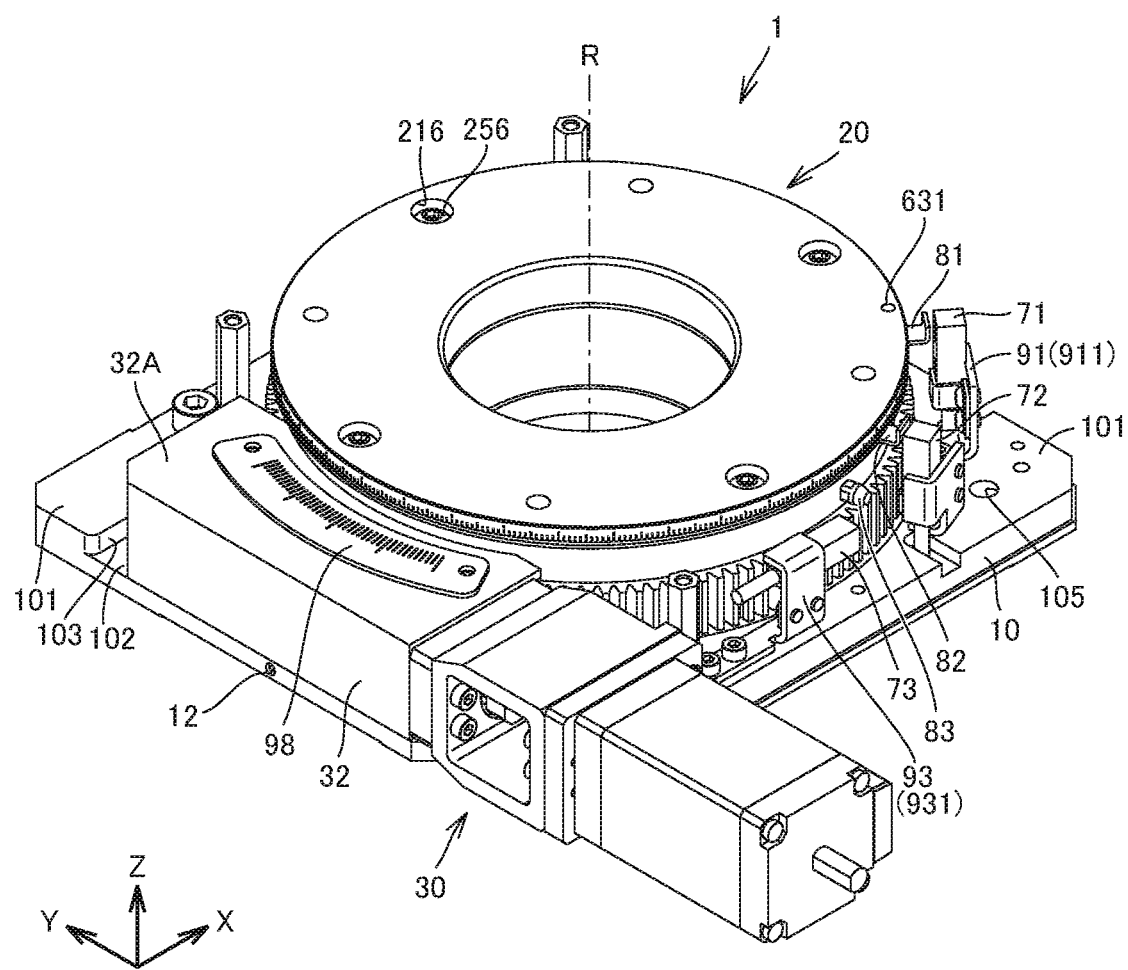
FIG. 1 is a perspective view showing the structure of a rotary table in Embodiment 1.

First, embodiments of the present disclosure will be listed and described. A rotary table according to the present disclosure includes: a base body having a planar holding surface; a movable ring arranged on the base body to be rotatable around an axis; a fixed ring arranged on an inner periphery side of the movable ring and fixed to the base body; and a plurality of rolling elements arranged to be rollable on an inner circumferential surface of the movable ring and an outer circumferential surface of the fixed ring. The rotary table includes a sensor fixed to the base body and a dog fixed to the movable ring. The movable ring has a scale extending at least at a portion of an outer peripheral side surface, and a groove-shaped recess formed to be recessed inward from an outer periphery of the movable ring at a position corresponding to the scale on the outer periphery. The dog has a leg portion fitted to the recess, and a detected portion protruding outward from the leg portion and detectable by the sensor. The leg portion is able to be fixed to the movable ring at any position in the recess.

There is a desire for a rotary table in which the rotation angle can be easily set, changed, and adjusted. It is conventionally well known for a rotary table to use a dog fixed to the rotary table and a sensor fixed to the base for the purpose of controlling the rotation operation of the table. A conceivable way to change the rotation angle of the rotary table is to change the position of the sensor or the position of the dog. However, the sensor used in a rotary table is often provided together with a dedicated bracket. This would limit the position and direction for attachment of the sensor. It was also sometimes difficult to secure the space for attaching the bracket. Under these circumstances, there was a desire for a sensor attachment structure that could be used even in a small rotary table. It was also desired to be able to easily and reliably change the position of the dog.

The present inventors have thoroughly studied these problems and found that the rotary table according to the present disclosure can solve the problems. In the rotary table according to the present disclosure, a scale is applied on the outer peripheral side surface of the movable ring, a recess is also provided at a position corresponding to the scale on the outer peripheral side surface of the movable ring, and the dog is movably secured in this recess. This configuration facilitates confirmation of the dog attachment position. Accordingly, even in the case where a user should adjust the rotation angle by him/herself, the user can easily perform the rotation angle adjustment work while looking at the scale.

In the above rotary table, the recess in the movable ring may be formed entirely around the outer peripheral side surface, and the leg portion of the dog may have a flat annular shape. According to this configuration, the shape of the movable ring becomes uniform over the entire periphery. This further improves the stability in the control of the rotary table and durability in long term use. In addition, the dog can be secured more reliably.

In the above rotary table, the movable ring may include an outer ring including a raceway surface of the rolling elements and a table fixed to an upper surface of the outer ring, and the outer ring and the table in combination may form the recess. According to this configuration, the design of the outer ring in a conventional rotary table can be utilized to constitute a movable ring that has a scale on its outer peripheral side surface and a recess on the outer peripheral side surface. This allows a rotary table with stable quality to be achieved at a reasonable cost.

In the above rotary table, the dog may include a plurality of dogs, and the plurality of dogs may be able to be fixed to the movable ring at any positions independently of each other. According to this configuration, the range of setting of the rotation angle becomes flexible, and further, in combination with an origin sensor, a rotary table applicable to a wide range of uses can be obtained.

In the above rotary table, the outer ring may be a worm wheel having an outer circumferential surface with a first gear formed over an entire circumferential direction. The rotary table may further include a worm screw unit fixed on the holding surface, and the worm screw unit may include a worm screw held to be rotatable around an axis and having a second gear that meshes with the first gear, and a worm screw housing surrounding and holding the worm screw and fixed so as to contact the holding surface at a planar contacting surface thereof. According to this configuration, a rotary table that is driven by a so-called worm drive is obtained. This rotary table can realize stable rotation control even in the case where a large load is applied, and is particularly suitable for applications requiring small rotation angles.

In the above rotary table, the worm screw housing may have a scale formed on an upper surface in a shape following the outer periphery of the movable ring. According to this configuration, the scale as a reference for adjustment of the dog becomes more easily visible, which further facilitates the adjustment of the dog.

In the above rotary table, one of the holding surface and the contacting surface may have a cylindrical pin arranged to protrude therefrom, and the other of the holding surface and the contacting surface may have a first recess formed to receive the pin, the first recess having a width corresponding to the pin and being elongated in a radial direction of the worm wheel. This configuration facilitates adjustment of a backlash in the worm drive, and in combination with the above-described configuration, provides a rotary table that is easier to handle and has excellent operational stability.

In the above rotary table, the sensor may be clamped and fixed to a holding member that includes a first plate member fixed to the base body and composed of a bent metal plate, and a second plate member fixed to the first plate member and composed of a bent metal plate. According to this configuration, even when the space for attaching a sensor is small, the sensor can be held using a member of simple structure. The sensor attachment member using sheet metal widens the ranges for the sensor attachment position and orientation, and allows the sensor to be attached in a desired position and orientation.

SPECIFIC EMBODIMENTS

Specific embodiments of the rotary table of the present disclosure will be described below with reference to the drawings. In the drawings referenced below, the same or corresponding portions are denoted by the same reference numerals and the description thereof will not be repeated.

Embodiment 1

Figure 2:
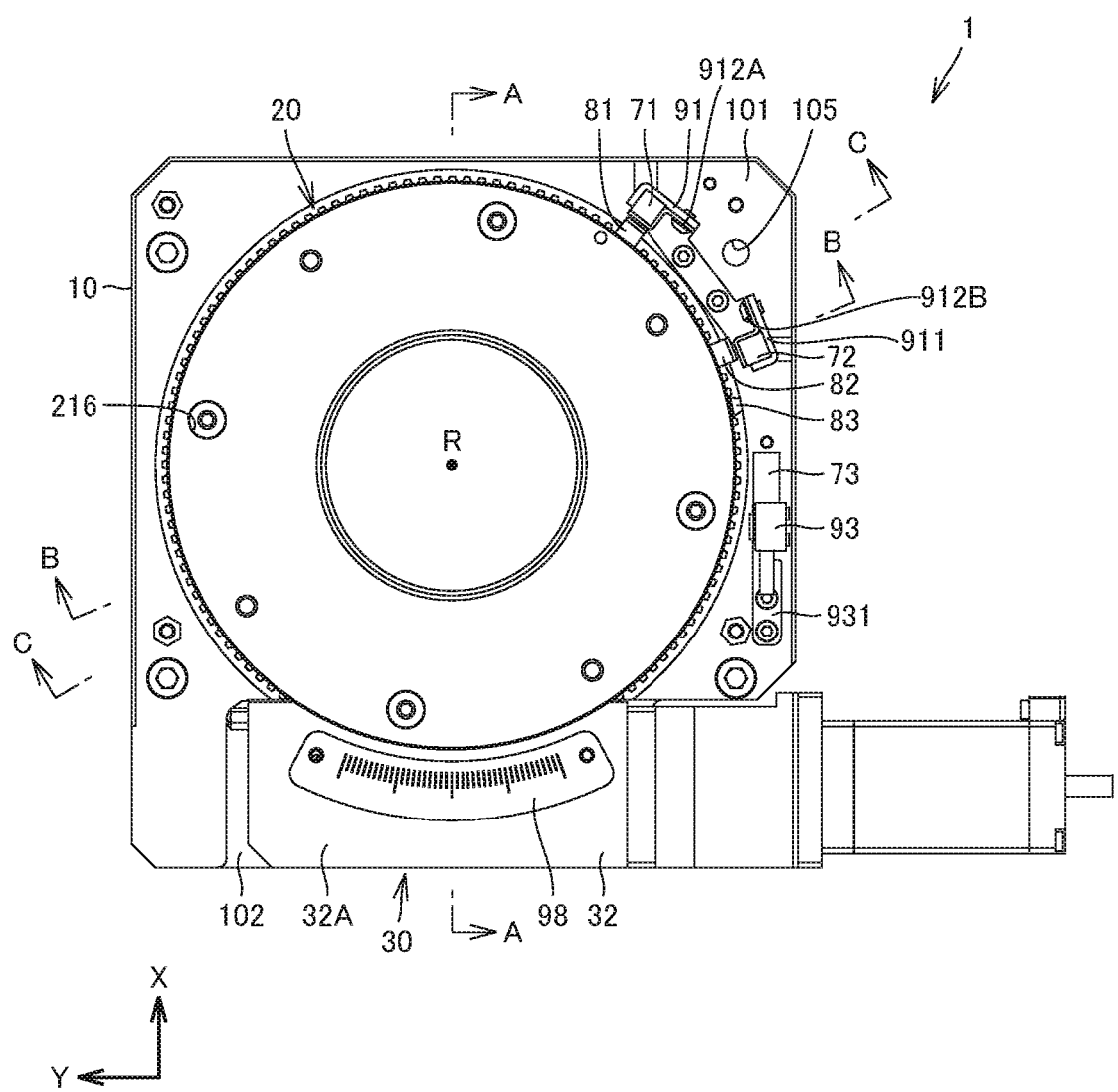
FIG. 2 is a plan view showing the structure of the rotary table in Embodiment 1.
Figure 3:
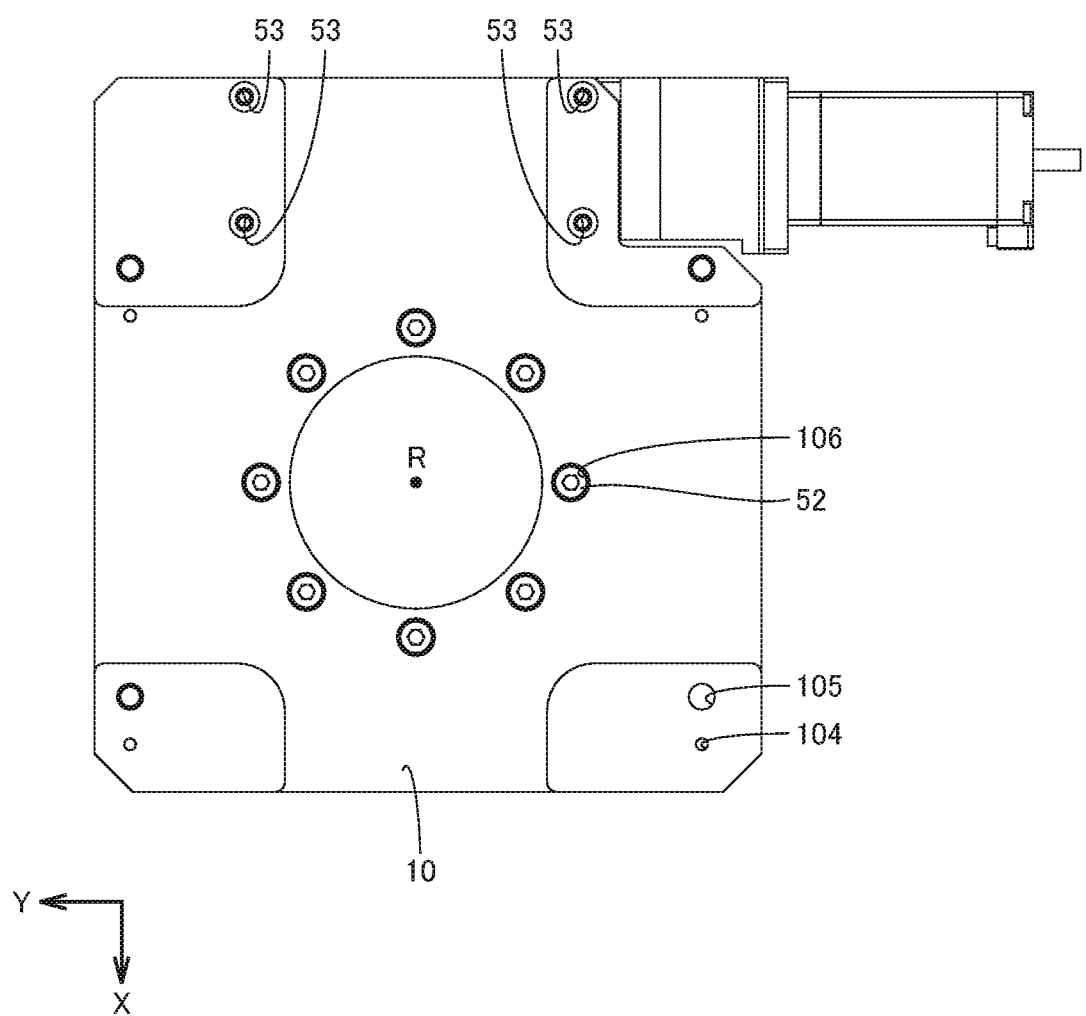
FIG. 3 is a plan view showing the structure of the rotary table in Embodiment 1.
Figure 4:
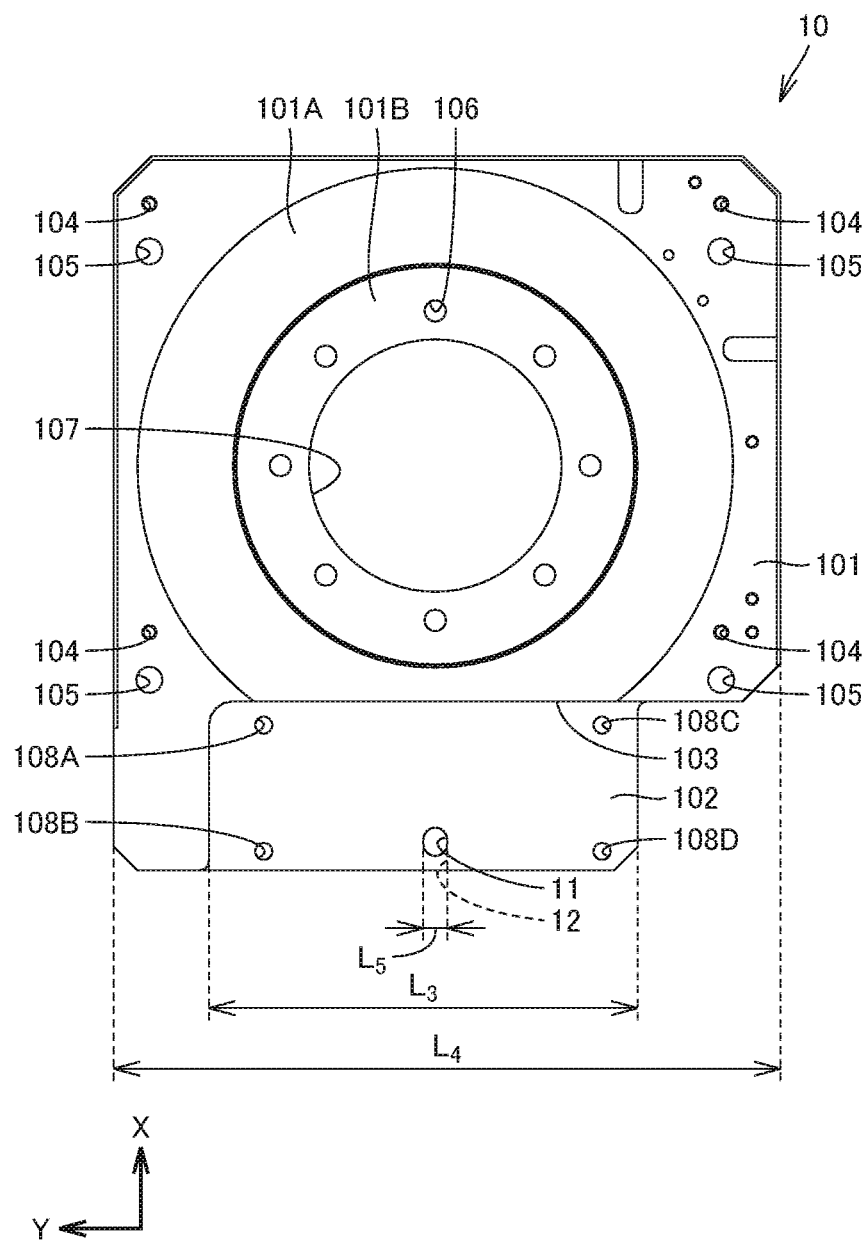
FIG. 4 is a plan view showing the structure of a base body.
Figure 5:
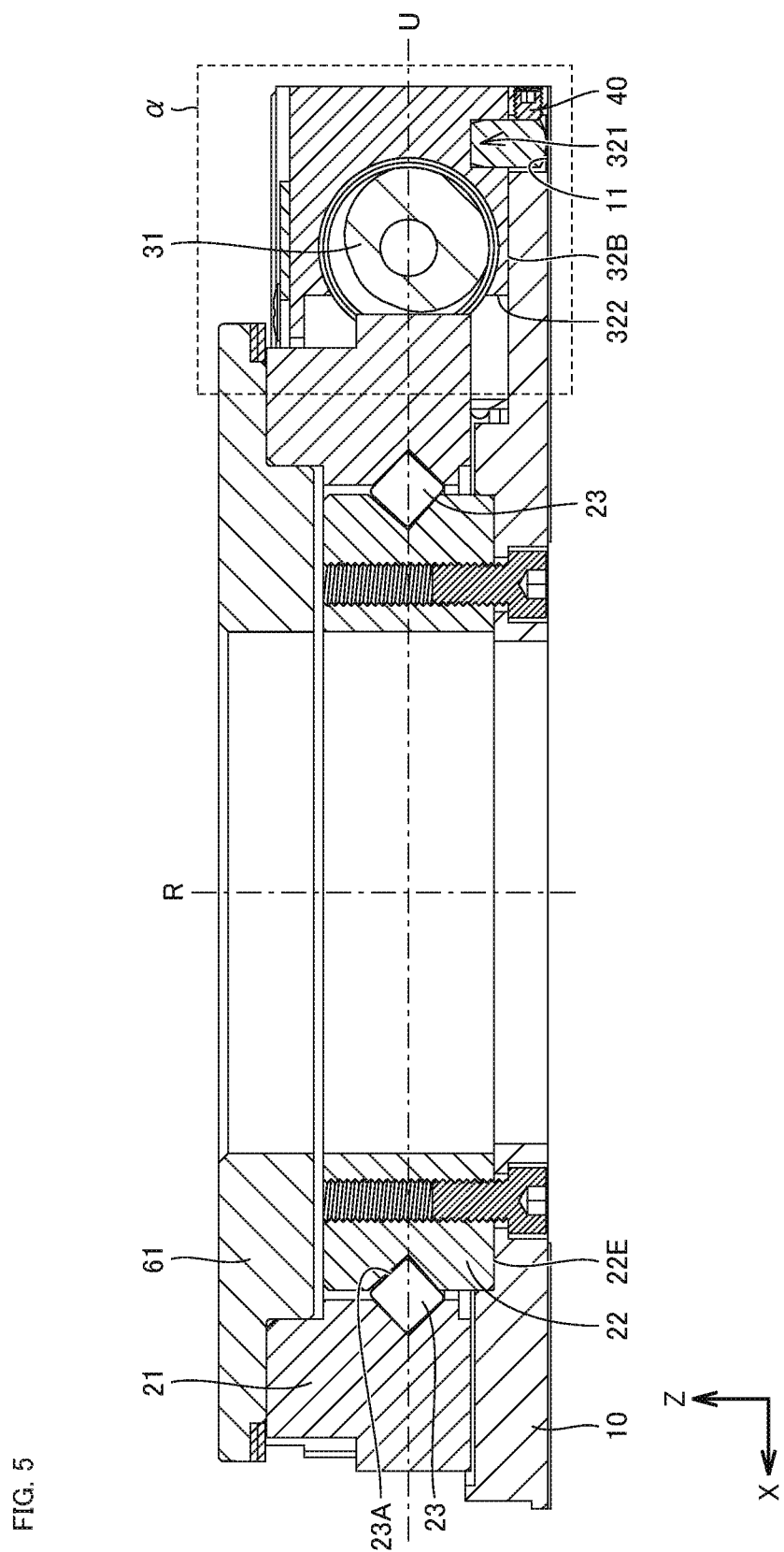
FIG. 5 is a cross-sectional view showing the structure of the rotary table in Embodiment 1.
Figure 6:
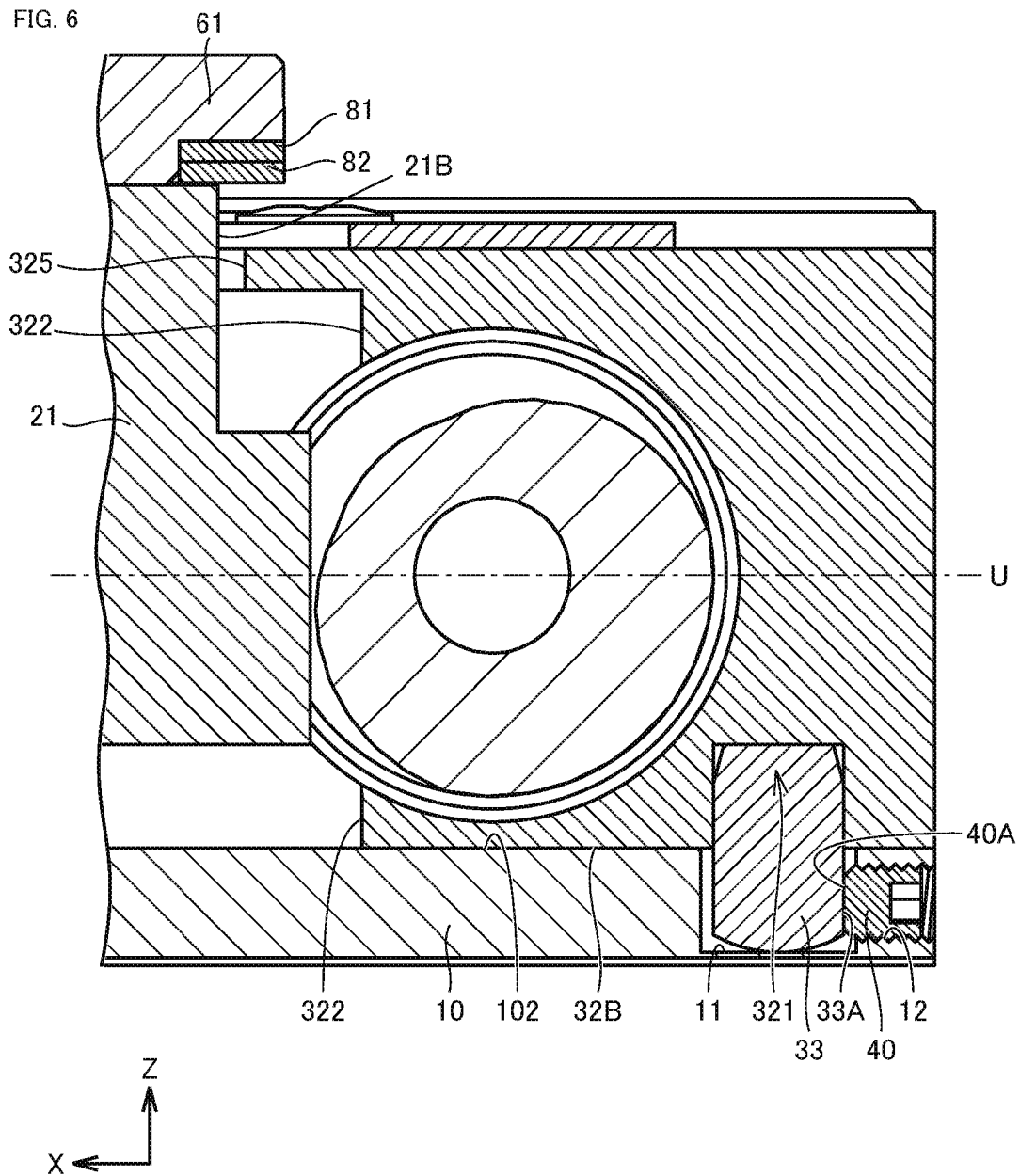
FIG. 6 is an enlarged cross-sectional view of a portion of FIG. 5.
Figure 7:
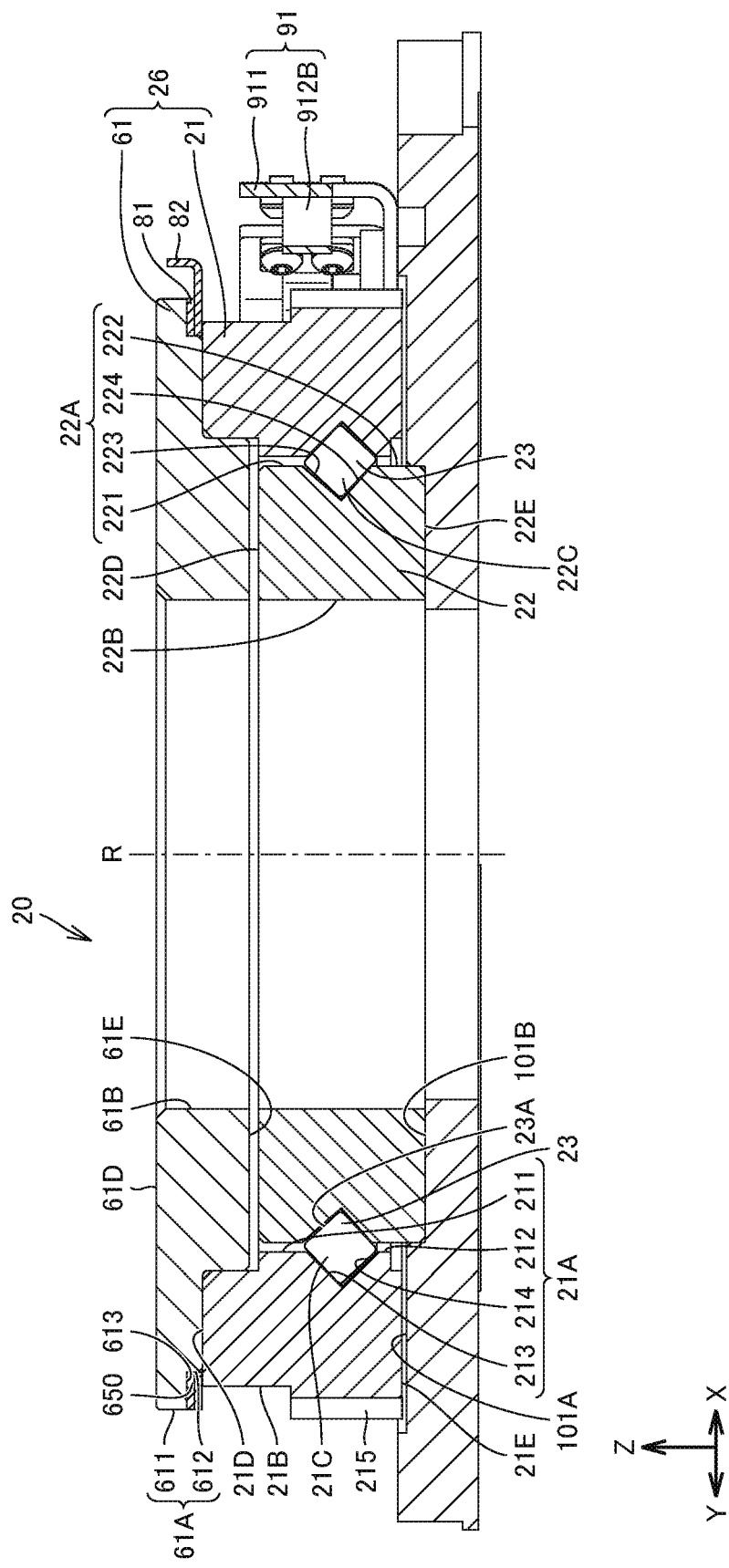
FIG. 7 is a cross-sectional view showing the structure of the rotary table in Embodiment 1.
Figure 8:
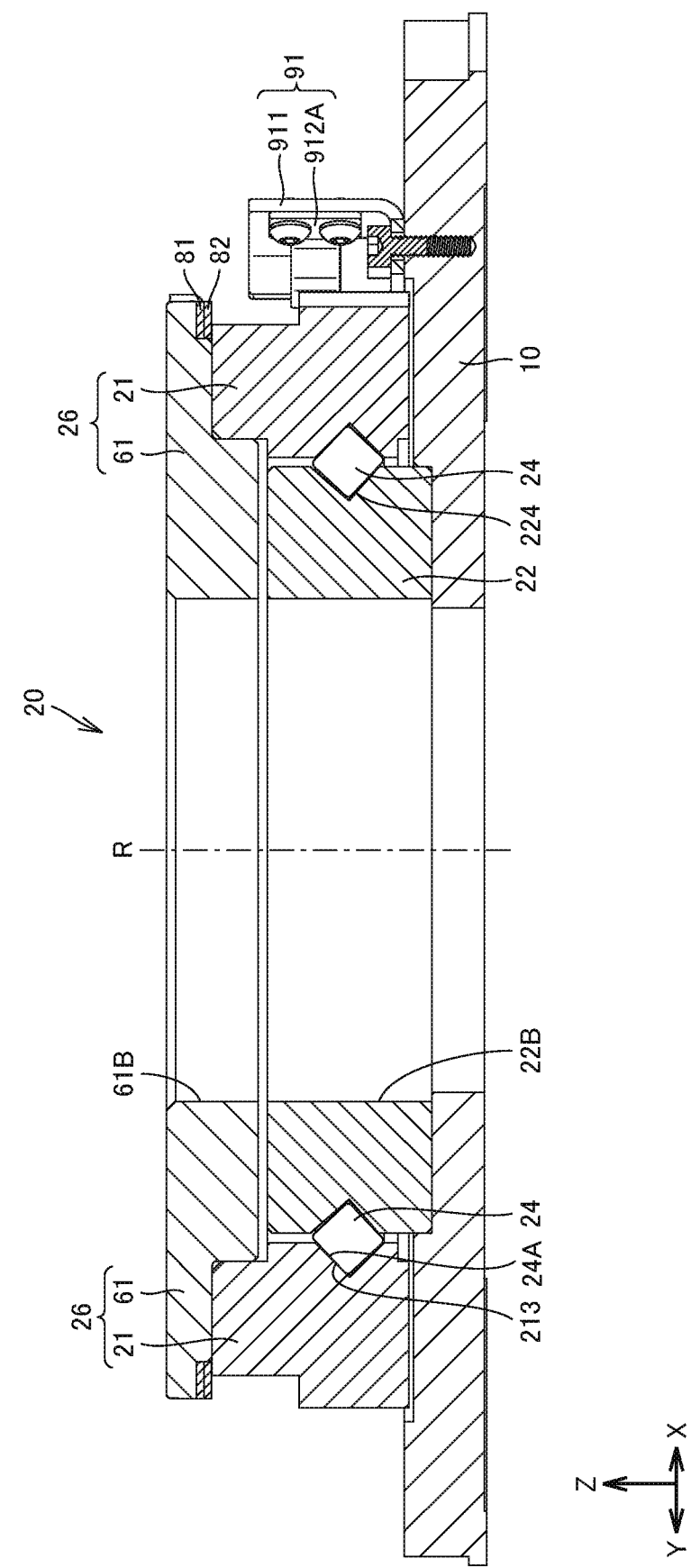
FIG. 8 is a cross-sectional view showing the structure of the rotary table in Embodiment 1.

FIG. 1 is a perspective view showing the structure of a rotary table in Embodiment 1. In FIG. 1, the Z axis direction is a direction (axial direction) along which a rotational axis R of a worm wheel extends. FIG. 2 is a plan view showing the structure of the rotary table. FIG. 3 is a plan view of the rotary table as seen from the viewpoint opposite to that of FIG. 2. FIG. 4 shows a base body constituting the rotary table. FIG. 5 is a cross-sectional view of the rotary table taken along A-A in FIG. 2. FIG. 6 is an enlarged cross-sectional view of a region a in FIG. 5. FIG. 7 is a cross-sectional view of the rotary table taken along B-B in FIG. 2. FIG. 8 is a cross-sectional view of the rotary table taken along C-C in FIG. 2.

Referring to FIGS. 1 to 3, the rotary table 1 in Embodiment 1 includes a base body 10, a rolling bearing unit 20, and a worm screw unit 30.

The base body 10 is described.

Referring to FIG. 1, the base body 10 has a plate shape. Referring to FIGS. 1 and 4, the base body 10 has a first surface 101, a second surface 102 serving as a holding surface of the worm screw unit 30, and a third surface 103. Referring to FIG. 1, the region corresponding to the first surface 101 has a thickness greater than that of the region corresponding to the second surface 102. In other words, the second surface 102 has a height in the Z axis direction lower than that of the first surface 101. The first surface 101 and the second surface 102 are connected via the third surface 103. Referring to FIG. 4, the first surface 101 has a planar shape. The first surface 101 has fourth through holes 105 formed at its corners to penetrate in the thickness direction. The first surface 101 has an annular recess 101B formed to surround a through hole 107. The through hole 107 penetrating in the thickness direction is formed at the center of the recess 101B. In plan view in the Z axis direction, the through hole 107 has a circular shape with the rotational axis R at its center. A ring-shaped recess 101A is formed to surround the recess 101B. Referring to FIG. 7, a region of the first surface 101 corresponding to the recess 101A has a thickness greater than that of a region of the first surface 101 corresponding to the recess 101B. Referring to FIG. 4, the recesses 101A and 101B have shapes corresponding to a worm wheel 21 and an inner ring 22 (FIG. 5), respectively, which will be described later. The recess 101B has a plurality of (in the present embodiment, eight) screw holes 106 formed at equal intervals in the circumferential direction. The first surface 101 has a plurality of (in the present embodiment, four) screw holes 104 formed on the outer periphery side from the recess 101A.

Referring to FIG. 4, the second surface 102 has a length $L_3$ in the Y axis direction shorter than a length La of the first surface 101 in the Y axis direction. The second surface 102 has a planar shape. The second surface 102 has fourth through holes 108A, 108B, 108C, and 108D formed to penetrate in the thickness direction. The through holes 108A, 108B, 108C, and 108D each have an inside diameter greater than an outside diameter of a threaded portion of a screw 53 (FIG. 3), which will be described later. The second surface 102 has a first recess 11 formed between the through hole 108B and the through hole 108D. In plan view in the Z axis direction, the first recess 11 is formed in a region of the second surface 102 closer to its long side opposite to the first surface 101 with respect to the center of the second surface 102 in the X axis direction. Referring to FIGS. 4 and 6, the base body 10 has a first screw hole 12 formed to communicate with the first recess 11. The first screw hole 12 extends along the X axis direction.

The rolling bearing unit 20 is described.

Referring to FIGS. 7 and 8, the rolling bearing unit 20 includes a worm wheel 21 as an outer ring, a table 61, an inner ring 22 as a fixed ring, and a plurality of first rollers 23 and a plurality of second rollers 24 as a plurality of rolling elements. The worm wheel 21 and the table 61 are fixed to each other to constitute a movable ring 26. The worm wheel 21 is disposed on the first surface 101 of the base body 10. The worm wheel 21 is arranged so as to correspond to the position of the recess 101A formed in the first surface 101. The worm wheel 21 is arranged such that the direction along the rotational axis R of the worm wheel 21 coincides with the direction perpendicular to the first surface 101 (Z axis direction). The worm wheel 21 has an annular shape.

The worm wheel 21 includes an inner circumferential surface 21A, an outer circumferential surface 21B, an end surface 21D in the axial direction, and an end surface 21E opposite to the end surface 21D in the axial direction. The outer circumferential surface 21B has a first gear 215 formed over the entire circumferential direction. The inner circumferential surface 21A includes a first region 211 and a second region 212. The first region 211 is located on the end surface 21D side with respect to the center of the inner circumferential surface 21A in the axial direction. The second region 212 is located on the end surface 21E side with respect to the center of the inner circumferential surface 21A in the axial direction. In the Z axis direction, an annular recessed space 21C is formed between the first region 211 and the second region 212. The space 21C is surrounded by a first rolling surface 213 of an annular shape and a second rolling surface 214 of an annular shape. The first rolling surface 213 and the second rolling surface 214 are crossing (orthogonal to) each other. The space 21C is formed along a rolling path of the first rollers 23 and the second rollers 24.

The table 61 is fixed to the worm wheel 21. The table 61 and the worm wheel 21 constitute the movable ring 26. The table 61 has an annular shape. The table 61 includes an outer circumferential surface 61A, an inner circumferential surface 61B, an end surface 61D in the axial direction, and an end surface 61E opposite to the end surface 61D in the axial direction. The end surface 61D of the table 61, which is the upper surface of the rotary table 1, has a planar shape. The outer circumferential surface 61A includes a first portion 611 and a second portion 612. The second portion 612 has a diameter smaller than that of the first portion 611. The first portion 611 has a scale applied over the entire periphery (FIG. 1). The first portion 611 and the second portion 612 are connected via an end surface 613. The end surface 613 is a surface parallel to the end surface 21D of the worm wheel 21. The second portion 612 has a diameter smaller than that of the outer circumferential surface 21B of the outer ring. As the worm wheel 21 and the table 61 are combined, a recess 650 is formed surrounded by the end surface 613, the second portion 612 of the outer circumferential surface, and the end surface 21D of the worm wheel 21. The recess 650 is a groove-shaped recess that is formed to be recessed inward from an outer periphery of the movable ring 26. The recess 650 is formed over the entire periphery of the movable ring 26. The inner circumferential surface 61B of the table 61 has a diameter approximately equal to that of an inner circumferential surface 22B of the inner ring 22. The table 61 has a plurality of (in the present embodiment, eight) screw holes 216 formed at equal intervals in the circumferential direction (FIG. 1). The screw holes 216 are arranged such that their positions coincide with the positions of eight screw holes 226 (FIG. 10) formed in the worm wheel 21. Four of the eight screw holes 216, 226 are utilized for fixing the table 61 to the worm wheel 21. Screws 256 ([FIG. 15]) are screwed into the screw holes 216 of the table 61 and the screw holes 226 of the worm wheel 21. In this manner, the table 61 is fixed to the worm wheel 21.

The inner ring 22 has an annular shape. The inner ring 22 is arranged on an inner periphery side of the worm wheel 21. The inner ring 22 is arranged so as to correspond to the position of the recess 101B (FIG. 4) formed in the first surface 101 of the base body 10. The inner ring 22 includes an outer circumferential surface 22A, the inner circumferential surface 22B, an end surface 22D in the axial direction, and an end surface 22E opposite to the end surface 22D in the axial direction. The outer circumferential surface 22A includes a third region 221 and a fourth region 222. The third region 221 is located on the end surface 22D side with respect to the center of the outer circumferential surface 22A in the axial direction. The fourth region 222 is located on the end surface 22E side with respect to the center of the outer circumferential surface 22A in the axial direction. In the Z axis direction, an annular recessed space 22C is formed between the third region 221 and the fourth region 222. The space 22C is surrounded by a third rolling surface 223 of an annular shape and a fourth rolling surface 224 of an annular shape. The third rolling surface 223 and the fourth rolling surface 224 are crossing (orthogonal to) each other. The space 22C is formed along the rolling path of the first rollers 23 and the second rollers 24. The first rolling surface 213 and the fourth rolling surface 224 face each other. In the present embodiment, in the cross section including the rotational axis R, the first rolling surface 213 and the fourth rolling surface 224 are arranged in parallel. The second rolling surface 214 and the third rolling surface 223 face each other. In the present embodiment, in the cross section including the rotational axis R, the second rolling surface 214 and the third rolling surface 223 are arranged in parallel.

The inner ring 22 has a plurality of screw holes 236 ([FIG. 16]) formed at equal intervals in the circumferential direction. The screw holes 236 are arranged such that their positions coincide with the positions of the screw holes 106 ([FIG. 3]) formed in the base body 10, and screws 52 ([FIG. 3]) are screwed into the screw holes 106 of the base body 10 and the screw holes 236 of the inner ring 22. In this manner, the inner ring 22 is fixed to the base body 10.

Referring to FIGS. 7 and 8, the first rollers 23 and the second rollers 24 each have a cylindrical shape. The first rollers 23 and the second rollers 24 are arranged alternately in the circumferential direction. The first rollers 23 are arranged to be able to roll while contacting the second rolling surface 214 and the third rolling surface 223 at their outer circumferential surfaces 23A. The second rollers 24 are arranged to be able to roll while contacting the first rolling surface 213 and the fourth rolling surface 224 at their outer circumferential surfaces 24A. The central axis of a first roller 23 and the central axis of a second roller 24 are crossing (orthogonal to) each other. Here, the state in which the central axis of the first roller 23 and the central axis of the second roller 24 are crossing means that when the center of gravity of the first roller 23 and the center of gravity of the second roller 24 pass a certain point during the rotation of the worm wheel 21, the central axis of the first roller 23 and the central axis of the second roller 24 intersect (orthogonally). In this manner, the worm wheel 21 is able to rotate around the rotational axis R with respect to the base body 10.

The worm screw unit 30 is described.

Figure 10:
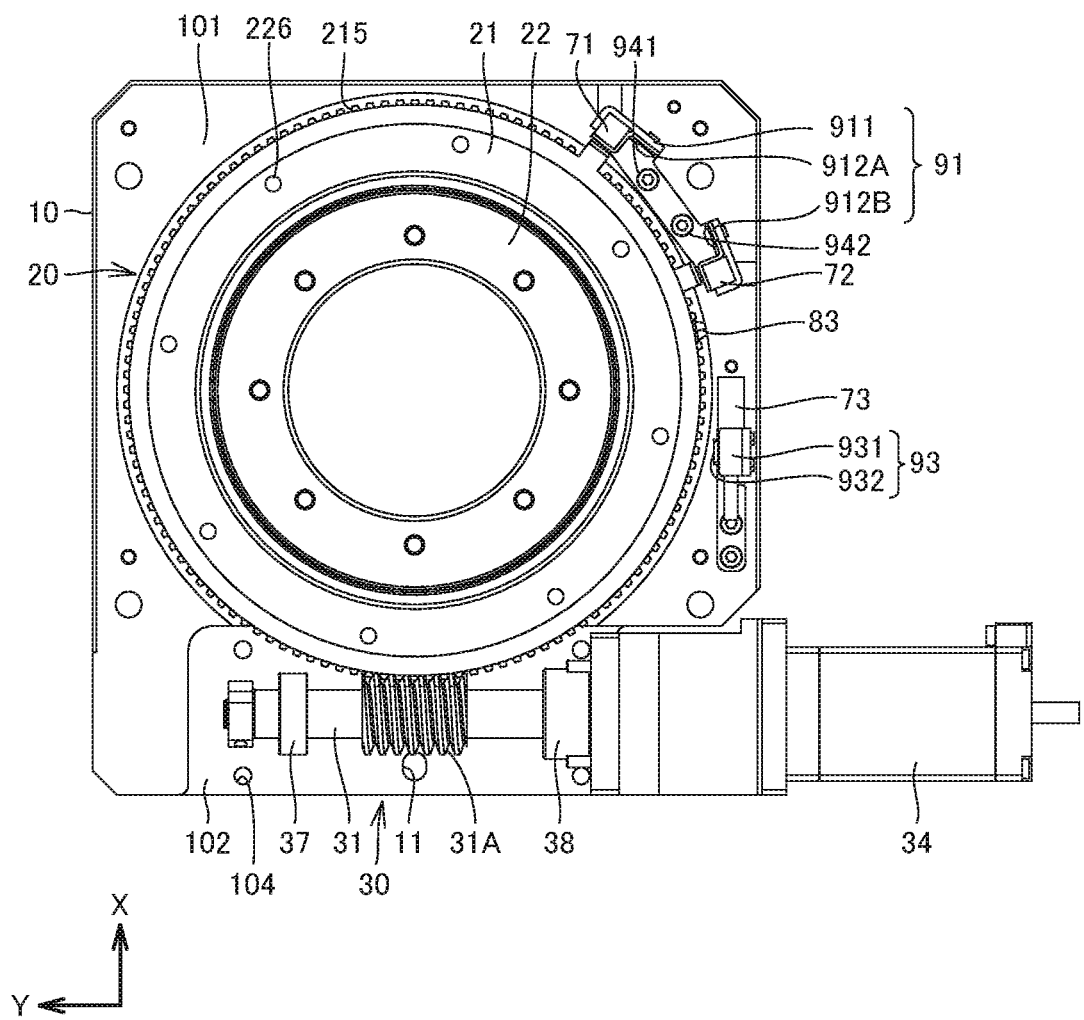
FIG. 10 is a plan view of the rotary table in Embodiment 1, with its configuration partially excluded.
Figure 11:
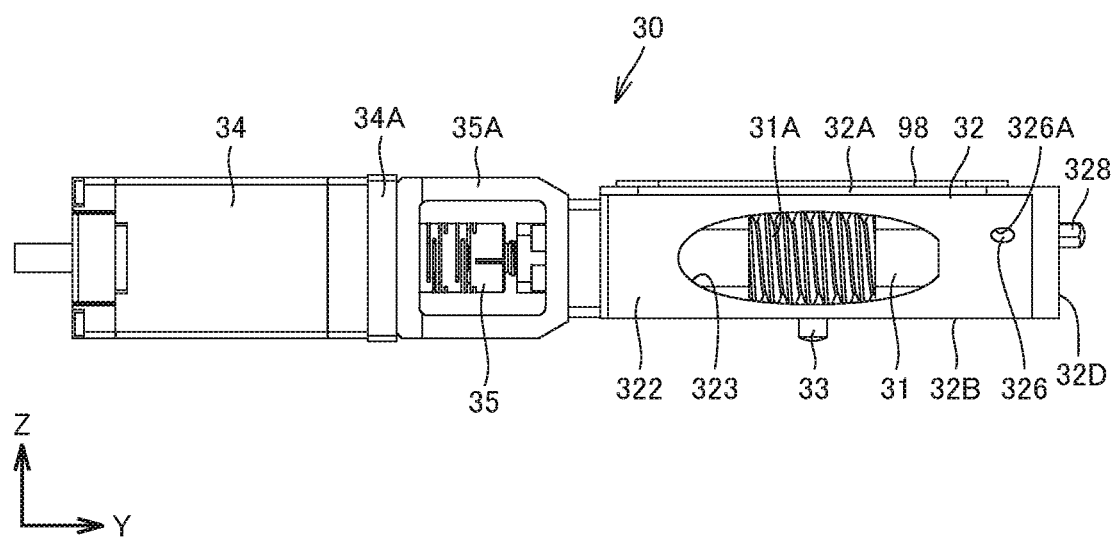
FIG. 11 is a side view showing the structure of a worm screw unit.
Figure 12:
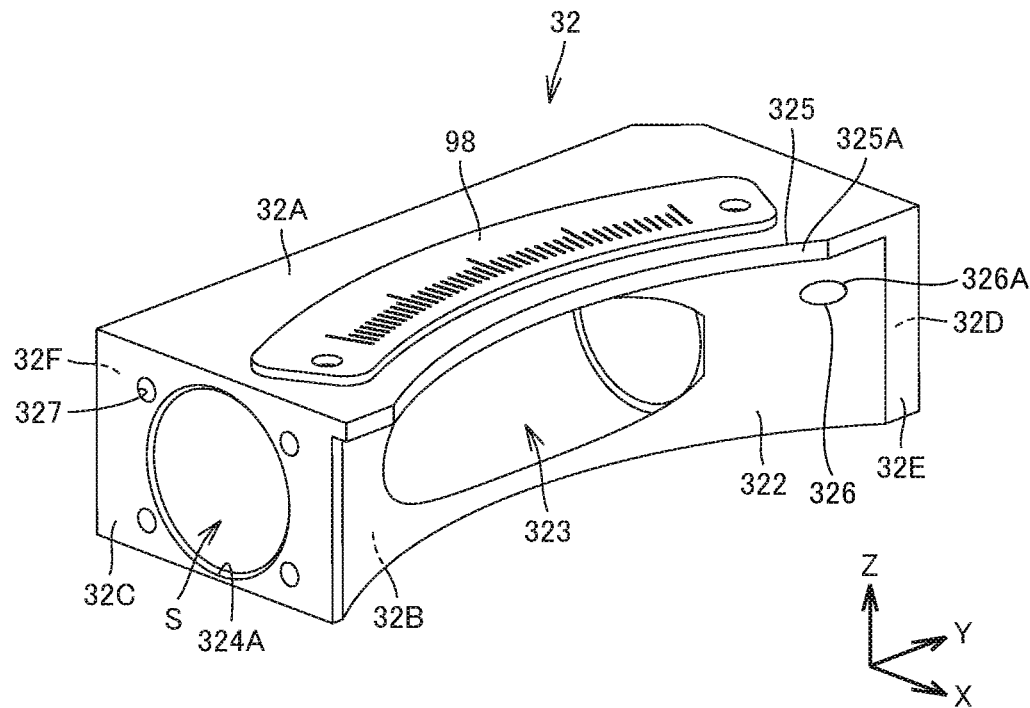
FIG. 12 is a schematic perspective view showing the structure of a worm screw housing.
Figure 13:
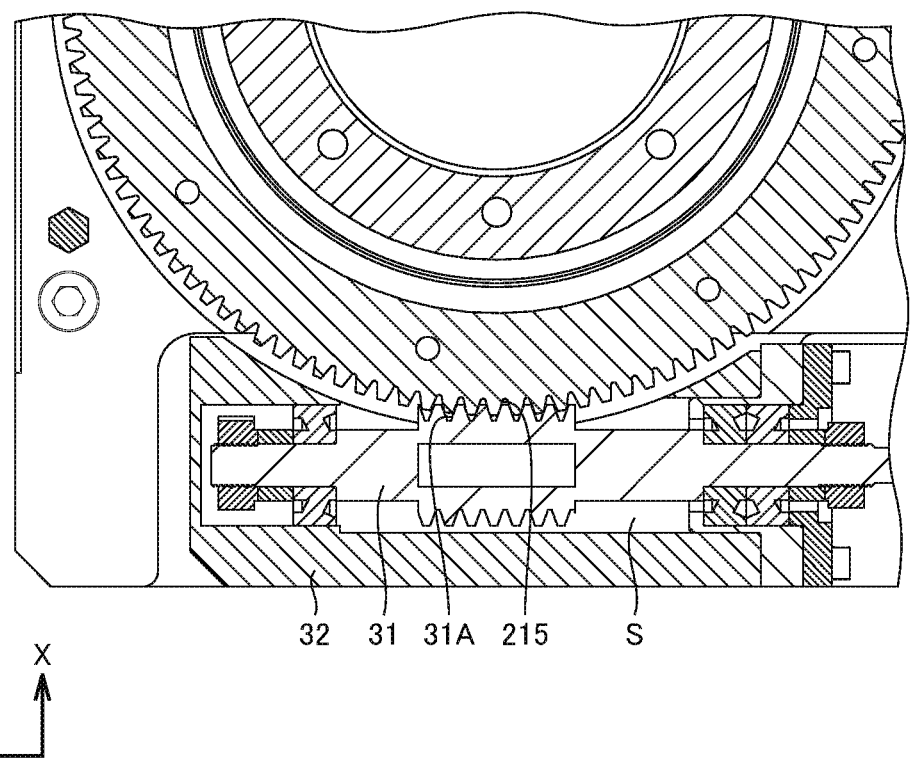
FIG. 13 is a cross-sectional view showing the structure of the rotary table in Embodiment 1.

FIG. 10 is a plan view of the rotary table 1, with some components including the table 61 and a worm screw housing 32 removed therefrom. FIG. 11 is a side view of the worm screw unit 30. FIG. 12 is a perspective view of the worm screw housing 32. FIG. 13 is an enlarged cross-sectional view of an area around a region where the first gear 215 and a second gear 31A contact each other.

Referring to FIG. 1, the worm screw unit 30 is disposed on the second surface 102 of the base body 10. Referring to FIGS. 10 and 11, the worm screw unit 30 includes a worm screw 31, a worm screw housing 32, a pin 33, a motor 34, a coupling 35, a first support bearing 37, and a second support bearing 38. The worm screw 31 has a columnar shape. The worm screw 31 has a second gear 31A formed on its outer circumferential surface. The second gear 31A meshes with the first gear 215. The worm screw 31 has one end portion fixed to an inner ring of the first support bearing 37. The first support bearing 37 has its outer ring fixed to the worm screw housing 32. The first support bearing 37 supports the worm screw 31 so as to be rotatable with respect to the worm screw housing 32. The coupling 35 is arranged at the other end portion of the worm screw 31. The motor 34 is fixed by a motor attachment 34A and attached to a motor bracket 35A. For the motor 34 in the present embodiment, a stepping motor or an AC servo motor, for example, can be adopted. The second support bearing 38 supports the worm screw 31 so as to be rotatable with respect to the coupling 35. The worm screw 31 is connected to the motor 34 via the coupling 35. The motor 34 is electrically connected to an external power source (not shown).

Referring to FIG. 12, the worm screw housing 32 has a rectangular parallelepiped shape with an internal space S formed therein. The worm screw housing 32 includes a first outer wall surface 32A, a second outer wall surface 32B as a contacting surface (bottom surface), a third outer wall surface 32C, a fourth outer wall surface 32D, a fifth outer wall surface 32E, and a sixth outer wall surface 32F. The first outer wall surface 32A, the second outer wall surface 32B, the third outer wall surface 32C, the fourth outer wall surface 32D, and the sixth outer wall surface 32F each have a planar shape. The first outer wall surface 32A and the second outer wall surface 32B are arranged aligned in the Z axis direction. The first outer wall surface 32A and the second outer wall surface 32B are arranged in parallel. The third outer wall surface 32C and the fourth outer wall surface 32D are arranged aligned in the X axis direction. The third outer wall surface 32C and the fourth outer wall surface 32D are arranged in parallel. The fifth outer wall surface 32E and the sixth outer wall surface 32F are arranged aligned in the Y axis direction. On an upper surface of the first outer wall surface 32A, a scale 98 is attached to follow the outer periphery of the movable ring 26.

Referring to FIGS. 6 and 12, the second outer wall surface 32B, which is the bottom surface of the worm screw housing 32, has a recess 321 formed therein. The third outer wall surface 32C has an opening 324A formed to communicate with the internal space S. Around the opening 324A, four screw holes 327 are formed. The fifth outer wall surface 32E has a curved (arc-shaped) opposing surface 322 that is recessed in the X axis direction. The opposing surface 322 has a first through hole 323 formed to communicate with the internal space S. The worm screw housing 32 includes a flange portion 325 that protrudes from the opposing surface 322 in the X axis direction. The flange portion 325 has, in its protruding direction, a curved (arc-shaped) tip end portion 325A. The tip end portion 325A constitutes a part of the fifth outer wall surface 32E.

Referring to FIGS. 11 and 12, the worm screw housing 32 has a lubrication hole 326 formed to penetrate from the fourth outer wall surface 32D to the opposing surface 322. The lubrication hole 326 has a first opening 326A on the opposing surface 322 and a second opening on the fourth outer wall surface 32D. The first opening 326A is formed spaced apart from the first through hole 323 in the Y axis direction. A grease nipple 328 is attached to close the second opening. Attachment of the grease nipple 328 facilitates adjustment of the grease supply amount.

Referring to FIG. 6, the pin 33 of a cylindrical shape is arranged to protrude from the second outer wall surface 32B. The pin 33 is fitted in the recess 321 in the second outer wall surface 32B. In the present embodiment, the pin 33 has an outside diameter slightly smaller than a width $L_5$ (FIG. 4) in the X axis direction of the first recess 11 in the base body 10.

Referring to FIGS. 11 and 13, the worm screw housing 32 surrounds the worm screw 31. The worm screw 31 is housed in the internal space S formed in the worm screw housing 32. The second gear 31A of the worm screw 31 is exposed from the first through hole 323 in the worm screw housing. Referring to FIG. 6, the second outer wall surface 32B, which is the bottom surface of the worm screw housing 32, contacts the second surface 102 of the base body 10. The opposing surface 322 of the worm screw housing 32 faces the outer circumferential surface 21B of the worm wheel 21. Referring to FIG. 13, the second gear 31A exposed from the first through hole 323 on the opposing surface 322 is in mesh with the first gear 215 of the worm wheel 21.

Referring to FIG. 6, the pin 33 is inserted into the long hole-shaped first recess 11 in the base body 10. The rotary table 1 further includes a hexagon socket set screw 40 which is a first screw screwed into the first screw hole 12 of the base body 10. The hexagon socket set screw 40 has its tip end portion 40A coming into contact with an outer circumferential surface 33A of the pin 33. Referring to FIGS. 3 and 4, the worm screw housing 32 is disposed such that the positions of the screw holes formed on the second outer wall surface 32B as the bottom surface of the worm screw housing 32 coincide with the positions of the through holes 108A, 108B, 108C, and 108D formed in the base body 10, and screws 53 are screwed thereinto. In this manner, the worm screw housing 32 is fixed to the base body 10.

A description is made of how to fix the worm screw unit 30 to the base body 10.

A structural body with the rolling bearing unit 20 attached to the base body 10 is first prepared. Next, as shown in FIG. 2, the worm screw unit 30 is disposed on the base body 10.

At this time, referring to FIG. 6, the pin 33 being press-fitted in the recess 321 in the worm screw housing 32 is inserted into the first recess 11 in the base body 10. Then, referring to FIGS. 2, 3, and 4, the screws 53 are inserted into the through holes 108A, 108B, 108C, and 108D to temporarily secure the worm screw housing 32 to the base body 10. Next, referring to FIG. 2, the worm screw unit is brought closer to the first gear 215 along the radial direction of the worm screw, to make the first gear 215 and the second gear 31A contact each other with appropriate force. Next, referring to FIG. 6, the hexagon socket set screw 40 is screwed into the first screw hole 12. Then, referring to FIGS. 2 and 3, the screws 53 are further tightened to thereby make the worm screw housing 32 fixed to the base body 10.

Here, in the rotary table 1 of the present embodiment, the first recess 11 has a width corresponding to the pin 33 (slightly greater than the outside diameter of the pin 33) and has a shape elongated in the radial direction of the worm wheel 21. Inserting the pin 33 into the first recess 11 allows the worm screw housing 32 to move in the radial direction, while restricting the movement of the worm screw housing 32 in the tangential direction of the worm wheel 21. It further allows the worm screw housing 32 to rotate with respect to the base body 10 with the pin 33 as a pivot point. By making the worm screw unit 30 approach the first gear 215 along the radial direction of the worm screw and by making the first gear 215 and the second gear 31A contact each other with appropriate force, the backlash between the first gear 215 and the second gear 31A can be adjusted appropriately through the movement of the worm screw housing 32 in the radial direction and its rotation with the pin 33 as the pivot point as described above. The adjustment of the backlash between the first gear 215 and the second gear 31A thus becomes easy. As such, the rotary table 1 in the present embodiment is able to easily adjust the backlash between the first gear 215 and the second gear 31A.

In the above embodiment, the first screw hole 12 is formed which is in communication with the first recess 11 and has an opening facing the outer circumferential surface of the pin 33. The rotary table 1 is equipped with the hexagon socket set screw 40 which is screwed into the first screw hole 12 and has its tip end portion 40A coming into contact with the outer circumferential surface 33A of the pin 33. After adjustment of the relative position of the worm screw housing 32 with respect to the base body 10, the hexagon socket set screw 40 is screwed into the first screw hole 12. This can regulate the relative movement of the worm screw housing 32 with respect to the base body 10. Accordingly, the changes over time of the backlash between the first gear 215 and the second gear 31A can be suppressed.

In the above embodiment, the worm screw housing 32 has the opposing surface 322 which faces the outer circumferential surface 21B of the worm wheel 21. The worm screw housing 32 includes the flange portion 325 which protrudes from the opposing surface 322 to cover a side surface 215A of the first gear 215 facing the opposing surface 322. Adopting such a configuration can reduce the chances of foreign matters entering into the region where the first gear 215 and the second gear 31A contact each other, and also reduce splattering of the grease to the outside of the rotary table 1.

In the above embodiment, referring to FIGS. 5, 7, and 8, the trajectory of a midpoint in the central axis of a first roller 23 and the trajectory of a midpoint in the central axis of a second roller 24 are included in a virtual plane U. In the present embodiment, the virtual plane U includes a region where the first gear 215 and the second gear 31A contact each other. In the Z axis direction, the height of the center of the trajectory in the rolling bearing unit 20 coincides with the height of gear contact between the first gear 215 and the second gear 31A in the worm screw unit 30. Arranging the rolling bearing unit 20 and the worm screw unit 30 in this manner facilitates optimizing the gear contact between the first gear 215 and the second gear 31A for the purpose of efficient transmission of force from the second gear 31A to the first gear 215.

The sensor and the dog for the rotary table are described. Referring to FIG. 1, the rotary table 1 has sensors 71, 72, and 73 as sensors fixed to the base body 10. The sensors 71, 72, and 73 are, for example, proximity sensors. The sensors 71 and 72 are used as limit sensors. The sensor 73 is used as an origin sensor. The sensors 71 and 72 are attached to the base body 10 via a holder 91, which is a holding member. The sensor 73 is attached to the base body 10 via a holder 93.

The rotary table 1 has dogs 81, 82, and 83 fixed to the movable ring 26. The dogs 81 and 82 are attached to the positions corresponding to the sensors 71 and 72 in the Z axis direction. The dog 83 is attached to the position corresponding to the sensor 73 in the Z axis direction.

Attachment structures of the dogs 81, 82, and 83 are described. Referring to FIGS. 1 and 10, the dog 83, which is an origin dog, is attached to an outer peripheral side surface of the worm wheel 21. The dog 83 is a member provided to protrude outward from the outer peripheral side surface of the worm wheel 21. The dog 83 is screwed into a screw hole provided on the outer peripheral side surface of the worm wheel 21.

Figure 9:
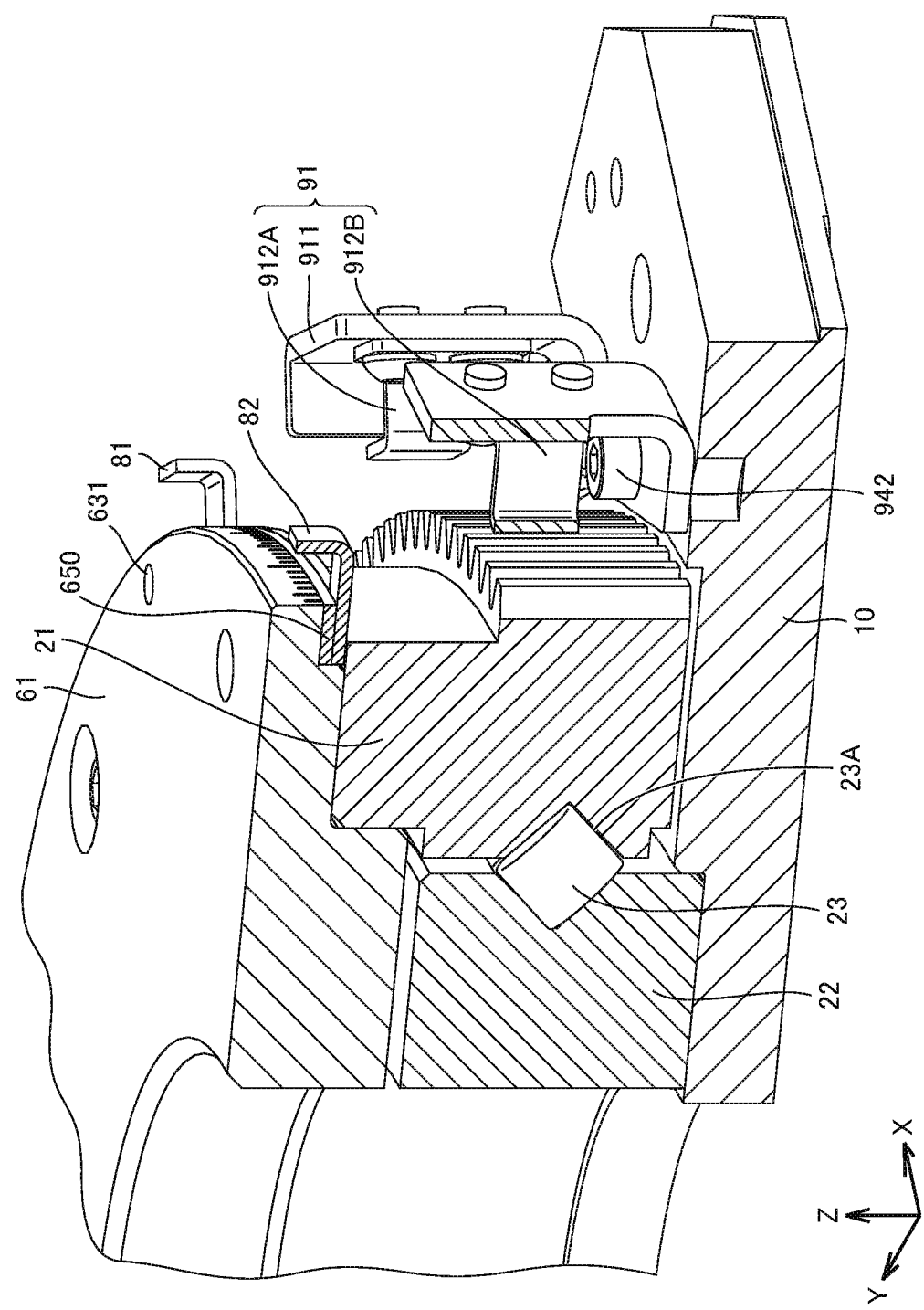
FIG. 9 is a cross-sectional perspective view showing the structure of the rotary table in Embodiment 1.
Figure 14:
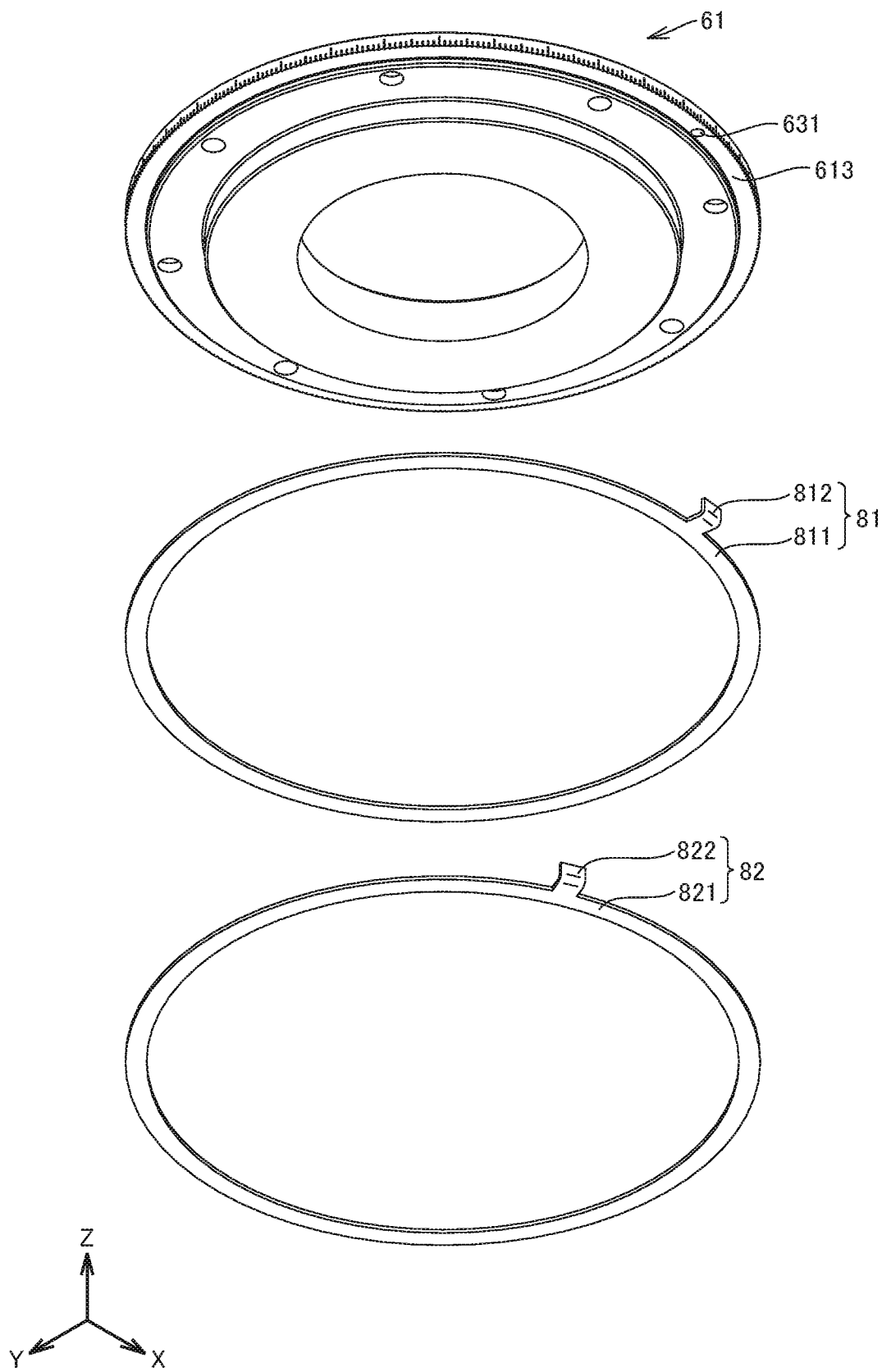
FIG. 14 is an exploded perspective view showing a table and dogs of the rotary table.
Figure 16:
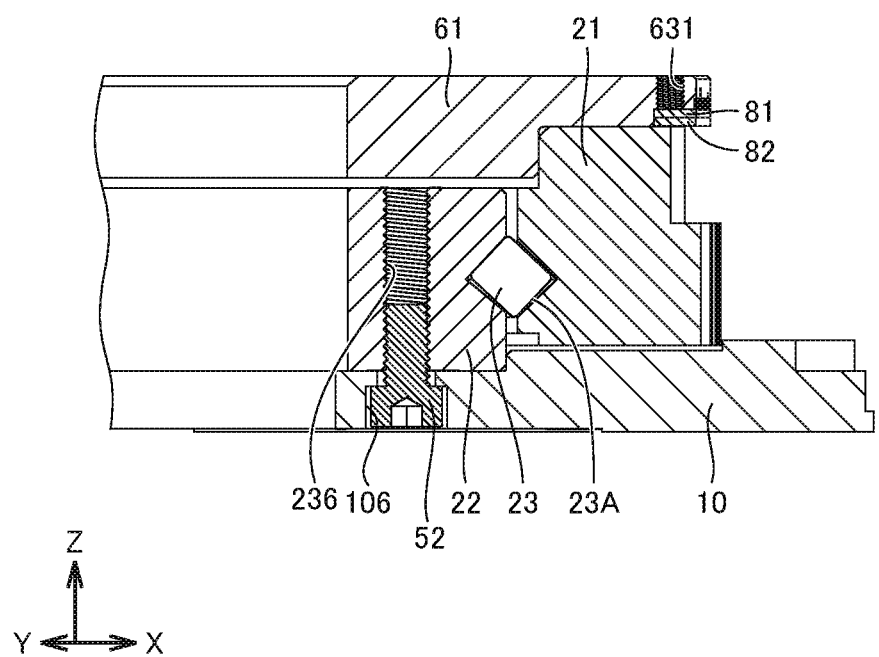
FIG. 16 is an enlarged cross-sectional view of a portion of the structure of the rotary table in Embodiment 1.

Referring to FIGS. 9, 14, and 16, the dogs 81 and 82 are members identical in shape. The dogs 81 and 82 have flat and annular leg portions 811 and 821 and detected portions 812 and 822 protruding outward from the leg portions, respectively. The detected portions 812, 822 have a portion extending in the Z axis direction. This shape facilitates detection by the sensors 71, 72. The dogs 81 and 82 are clamped in the recess 650 formed by the table 61 and the worm wheel 21. The table 61 has a screw hole 631 formed therein. The screw hole 631 is a through hole that penetrates from the end surface 61D, which is the upper surface of the table 61, to the end surface 613 (FIG. 7). Inserting a screw into the screw hole 631 and tightening it can press and fix the dogs 81 and 82. Loosening the screw allows the dogs 81 and 82 to rotate in the circumferential direction of the movable ring 26 in the state of being held in the recess 650. In other words, the dogs 81 and 82 can be fixed at any desired positions by loosening the screw and rotating the dogs 81 and 82 to desired positions and tightening the screw again. The dogs 81 and 82 are moved independently of each other.

Figure 15:
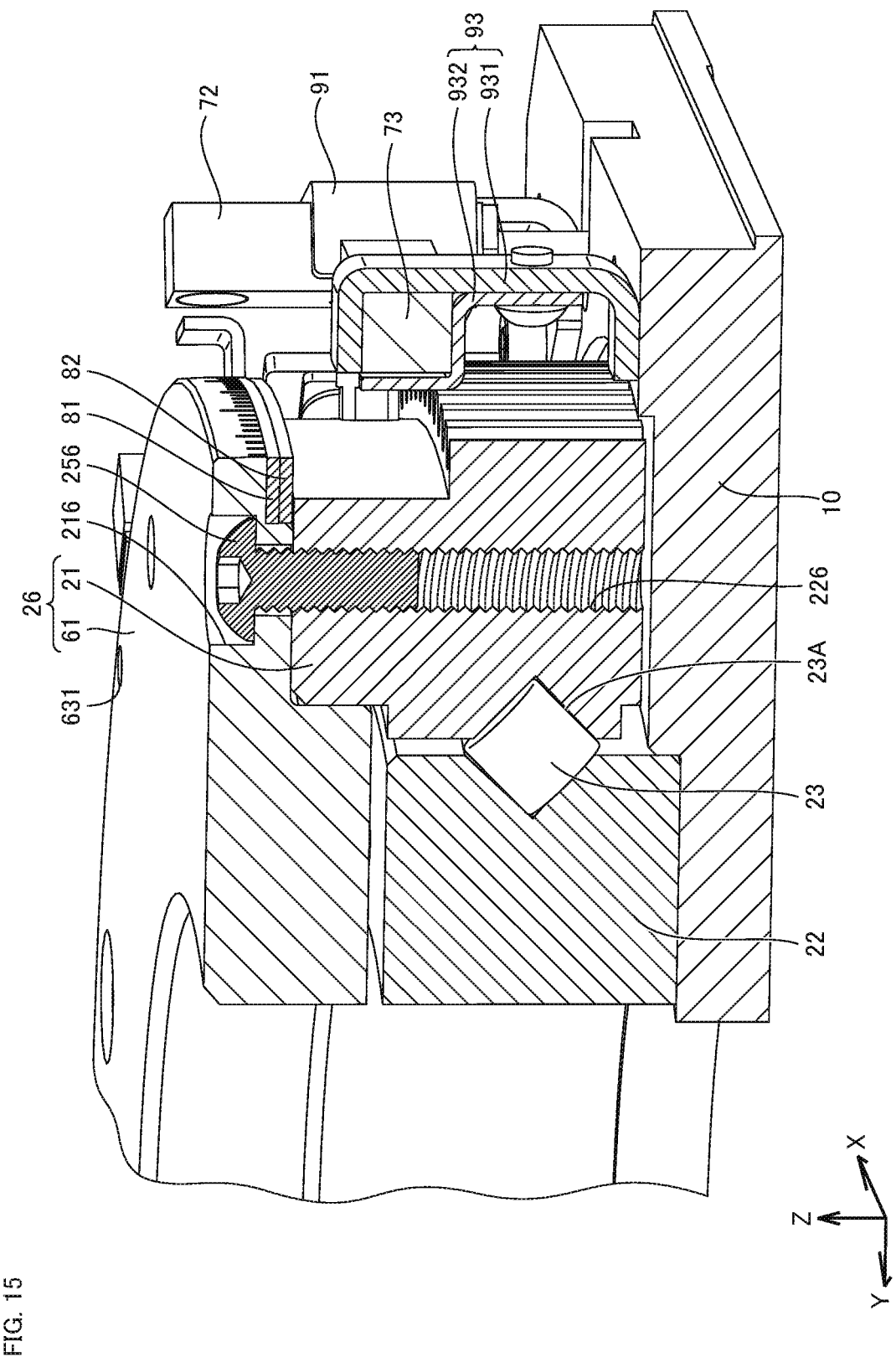
FIG. 15 is an enlarged cross-sectional perspective view of a portion of the structure of the rotary table in Embodiment 1.

Referring to FIGS. 15 and 16, the table 61 and the worm wheel 21 are fixed to each other via the screws 256 inserted into the screw holes 216 and 226. On the other hand, the dogs 81 and 82 are fixed to the movable ring 26 via the screw inserted into the screw hole 631. This structure allows the positions of the dogs 81 and 82 to be changed without loosening the fixation between the table 61 and the worm wheel 21. Further, the scale formed on the outer circumferential surface 61A of the table 61 can be referred to when determining the positions of the dogs. This ensures easy positioning. In addition, by also utilizing the scale 98 (FIG. 12) for positioning, the positions of the dogs can be easily set and changed on the user side.

Referring to FIGS. 9 and 10, the holder 91, which is the holding member for the sensors 71 and 72, includes a base portion 911 as a first plate member, and holding portions 912A and 912B as second plate members. In FIG. 9, the sensors 71 and 72 are not shown for ease of understanding. The base portion 911 is composed of a bent metal plate. The base portion 911 is fixed to the base body 10 via screws 941 and 942. The base portion 911 has a first portion that is in contact with the first surface 101 as the upper surface of the base body 10 and extends in the circumferential direction corresponding to the outer periphery of the worm wheel 21, and a second portion that rises from the first portion in the Z axis direction. The holding portions 912A and 912B are fixed to the second portion of the base portion 911. The holding portions 912A and 912B are each composed of a bent metal plate. The sensor 71 is clamped between the base portion 911 and the holding portion 912A. The sensor 72 is clamped between the base portion 911 and the holding portion 912B. The sensor holding member configured in this manner allows the sensor to be held with the holding member that utilizes simple members. According to such a holding member, a plurality of sensors are easily installed even in a small rotary table having a limited space for installing the sensors.

The holder 93, which is the holding member for the sensor 73, includes a base portion 931 as a first plate member and a holding portion 932 as a second plate member. The base portion 931 and the holding portion 932 are each composed of a bent metal plate. The base portion 931 is screw-fastened to the first surface 101 as the upper surface of the base body 10. The holding portion 932 is screw-fastened to the base portion 931. The sensor 73 is clamped between the base portion 931 and the holding portion 932. Although the sensors 71, 72 and the sensor 73 differ in the installation direction from each other, in each installation direction, a sensor is held by a holder 91, 93 composed of a combination of two plate members.

(Variations)

The structure for fixing a dog to the movable ring is not limited to that of the above-described embodiment. For example, a dog and the table as one piece may be configured to rotate with respect to the worm wheel and to be fixed at any position. Alternatively, a dog and the worm wheel as one piece may be configured to rotate with respect to the table and to be fixed at any position. The number of dogs can also be changed depending on the desired rotation operation. Two dogs may be provided which are fixed to the outer ring, and one movable dog may be provided which is held movably with respect to the outer ring.

The scale and the recess provided on the outer periphery of the movable ring are not limited to those provided over the entire periphery of the movable ring. The scale and the recess may be formed on only a portion of the outer periphery of the movable ring, and a dog may be moved within the range of the recess extending in the circumferential direction.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

1: rotary table; 10: base body; 11: first recess; 12: first screw hole; 13: second screw hole; 20: unit; 21: worm wheel; 21A, 22B: inner circumferential surface; 21B, 22A, 23A, 24A, 33A: outer circumferential surface; 21C, 22C: space; 21D, 21E, 22D, 22E: end surface; 22: inner ring; 23: first roller; 24: second roller; 26: movable ring; 30: worm screw unit; 31: worm screw; 31A: second gear; 32: worm screw housing; 32A: first outer wall surface; 32B: second outer wall surface; 32C: third outer wall surface; 32D: fourth outer wall surface; 32E: fifth outer wall surface; 32F: sixth outer wall surface; 33: pin; 34: motor; 34A: motor attachment 35: coupling; 35A: motor bracket; 37: first support bearing; 38: second support bearing; 40: hexagon socket set screw; 40A, 325A: tip end portion; 52, 53: screw; 101: first surface; 101A, 101B, 321: recess; 102: second surface; 103: third surface; 104, 106, 216, 226, 236, 327: screw hole; 105, 107, 108A, 108B, 108C, 108D: through hole; 211: first region; 212: second region; 213: first rolling surface; 214: second rolling surface; 215: first gear; 221: third region; 222: fourth region; 223: third rolling surface; 224: fourth rolling surface; 322: opposing surface; 323: first through hole; 324A: opening; 325: flange portion; 326: lubrication hole; 326A: first opening; 328: grease nipple; 61: table; 611, 612: portion; 613: end surface; 61A: outer circumferential surface; 61B: inner circumferential surface; 61D, 61E: end surface; 631: screw hole; 650: recess; 71, 72, 73: sensor; 81, 82, 83: dog; 811: leg portion; 812: detected portion; 91, 93: holder; 911, 931: base portion; 912A, 912B, 932: holding portion; and 98: scale.

The invention claimed is:

1. A rotary table comprising:
a base body having a planar holding surface;
a movable ring arranged on the base body to be rotatable around an axis;
a fixed ring arranged on an inner periphery side of the movable ring and fixed to the base body; and
a plurality of rolling elements arranged to be rollable on an inner circumferential surface of the movable ring and an outer circumferential surface of the fixed ring;
the rotary table including a sensor fixed to the base body and a dog fixed to the movable ring,
the movable ring having
a scale extending at least at a portion of an outer peripheral side surface, and
a groove-shaped recess formed to be recessed inward from an outer periphery of the movable ring at a position corresponding to the scale on the outer periphery,
the dog having
a leg portion fitted to the recess, and
a detected portion protruding outward from the leg portion and detectable by the sensor,
the leg portion being able to be fixed to the movable ring at any position in the recess.

2. The rotary table according to claim 1, wherein
the recess is formed entirely around the outer peripheral side surface of the movable ring, and
the leg portion of the dog has a flat annular shape.

3. The rotary table according to claim 1, wherein the movable ring includes an outer ring including a raceway surface of the rolling elements and a table fixed to an upper surface of the outer ring, and the outer ring and the table in combination form the recess.

4. The rotary table according to claim 3, wherein the outer ring is a worm wheel having an outer circumferential surface with a first gear formed over an entire circumferential direction,
the rotary table further comprising a worm screw unit fixed on the holding surface, the worm screw unit including a worm screw held to be rotatable around an axis and having a second gear that meshes with the first gear, and a worm screw housing surrounding and holding the worm screw and fixed so as to contact the holding surface at a planar contacting surface thereof.

5. The rotary table according to claim 4, wherein the worm screw housing has a scale formed on an upper surface in a shape following a periphery of the outer ring.

6. The rotary table according to claim 4, wherein one of the holding surface and the contacting surface has a cylindrical pin arranged to protrude therefrom, and the other of the holding surface and the contacting surface has a first recess formed to receive the pin, the first recess having a width corresponding to the pin and being elongated in a radial direction of the worm wheel.

7. The rotary table according to claim 1, wherein the dog includes a plurality of dogs, and the plurality of dogs are able to be fixed to the movable ring at any positions independently of each other.

8. The rotary table according to claim 1, wherein the sensor is clamped and fixed to a holding member, the holding member including
   a first plate member fixed to the base body and composed of a bent metal plate, and
   a second plate member fixed to the first plate member and composed of a bent metal plate.

* * * * *